United States Patent [19]
Muto et al.

[11] Patent Number: 6,111,657
[45] Date of Patent: Aug. 29, 2000

[54] INFORMATION PROCESSING APPARATUS AND METHOD CAPABLE OF PROCESSING INFORMATION BASED ON THE AMOUNT OF DATA TRAFFIC ON A NETWORK

[75] Inventors: Shin Muto, Kawasaki; Satoshi Nagata, Tama; Hiroharu Takahashi, Yokohama, all of Japan

[73] Assignee: Canon Kabushiki Kaisha, Tokyo, Japan

[21] Appl. No.: 08/934,511

[22] Filed: Sep. 22, 1997

[30] Foreign Application Priority Data

Apr. 9, 1998 [JP] Japan .................................... 8-272930

[51] Int. Cl.⁷ .................................................... G06K 15/00
[52] U.S. Cl. ............................................ 358/1.2; 358/1.13
[58] Field of Search ..................................... 395/101, 102, 395/109, 111–115, 117; 709/223, 224, 246, 247, 232, 235; 382/232, 239; 370/230, 232, 235, 252; 710/65, 68; 358/1.1, 1.2, 1.9, 1.12, 1.13, 1.14, 1.15, 1.16, 1.18

[56] References Cited

U.S. PATENT DOCUMENTS 5,664,105  9/1997  Keisling et al. .......................... 709/224
5,761,438  6/1998  Sasaki ...................................... 709/247

*Primary Examiner*—Arthur G. Evans
*Attorney, Agent, or Firm*—Fitzpatrick, Cella, Harper & Scinto

[57] ABSTRACT

In an information processing system capable of suppressing an amount of data traffic relating to process on a network and reducing a processing time, the amount of data traffic is measured. If the measured amount exceeds a predetermined value and if the amount of data traffic is to be suppressed, then it is determined whether a resolution is to be lowered, and/or whether the number gradation levels is to be reduced. Based on a positive determination, the system temporarily shifts to a lower resolution and/or reduces the number of gradation levels, and converts the data to be processed accordingly.

57 Claims, 10 Drawing Sheets

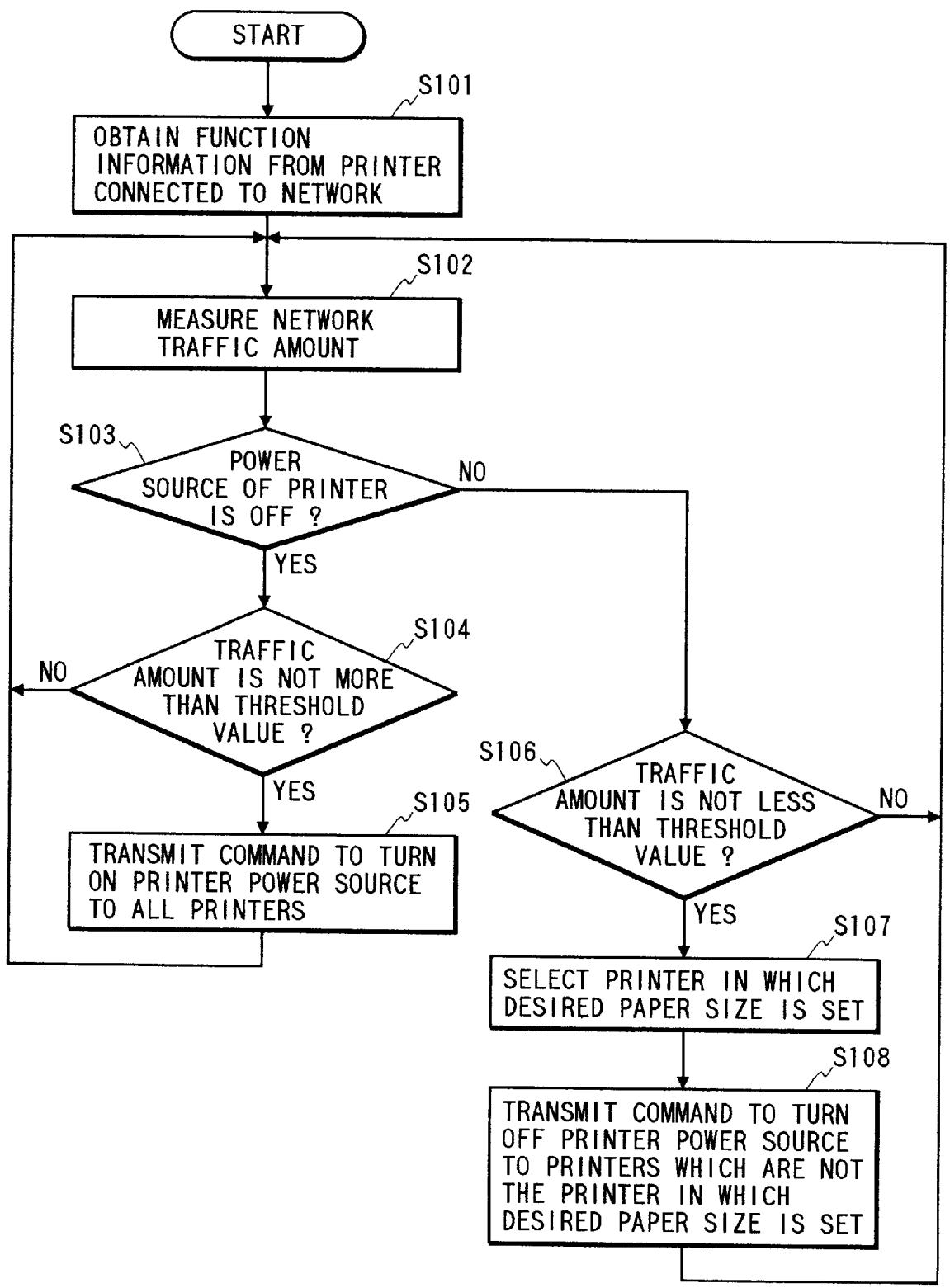

INFORMATION PROCESSING APPARATUS AND METHOD CAPABLE OF PROCESSING INFORMATION BASED ON THE AMOUNT OF DATA TRAFFIC ON A NETWORK

BACKGROUND OF THE INVENTION

1. Field of the Invention

The present invention relates to an information processing apparatus and an output device, capable of information processing according to the traffic amount on a network.

2. Related Background Art

In the conventional output control system composed of a host computer and an output device such as a printer connected thereto, the process of generating output image data, to be outputted by the output device, from input data to the host computer is executed either by the host computer or the output device.

The data transmitted from the host computer to the output device are converted, in the host computer, into output data that can be interpreted by the output device, such as PDL (printer description language), based on user selected values such as print resolution and print colors or on predetermined system initial values, prior to the transmission to the output device.

Also in such output device, there is already known a method of suppressing the electric power consumption therein by shutting off or reducing the power supply to the output mechanism etc. in the output device, in case the output process is not conducted over a predetermined period.

However, in such conventional output control system, the data traffic amount on the network is not taken into consideration in case of forming an output control system by connecting the host computer and the output device through a network interface. Consequently, the transfer of data of a large amount such as color output data or output image data, in case the data traffic amount on the network is already high, further increases the data traffic amount on the network, thereby leading to the deterioration of the data transfer efficiency in the entire network.

Also whether the generation of the output image data is to be executed by the host computer or the output device is uniquely determined regardless of the size of the output image data to be generated. For this reason, the efficiency of the output process may be deteriorated depending on the state of data traffic on the network.

Furthermore, the execution of the output process in a state where the data transfer efficiency on the network is inferior will increase the proportion of the data reception waiting state in the entire output process time of the output device, thus leading to an extended output process time and eventually resulting in a higher proportion of the electric power consumption in the output device and a higher energy consumption.

Also in the conventional output device which shuts off or reduces the power supply in case the output process is not conducted for a predetermined period, the user wishing to use the output device again may have to wait as long as several minutes until the output device becomes ready for use.

SUMMARY OF THE INVENTION

In consideration of the foregoing, a first object of the present invention is to provide an output control device, an output device and an output controlling method capable of suppressing the data traffic amount relating to the output process on the network and reducing the output process time.

A second object of the present invention is to provide an output control device, an output device and an output control method capable of saving the electric power consumption in the entire output device.

The above-mentioned objects can be attained, according to an embodiment of the present invention, by an information processing apparatus capable of generating output information for output onto a network, comprising:

generation means for generating output information, to be outputted to the network, based on predetermined set information;

measurement means for measuring the traffic amount on the network; and changing means for changing the set information to be used in the generation of the output information by the generation means, based on the traffic amount measured by the measurement means.

According to another embodiment of the present invention, there is provided an information processing apparatus capable of generating output information for output onto a network, comprising:

first generation means for generating output information;

second generation means for generating image data, based on the output information generated by the first generation means;

measurement means for measuring the traffic amount on the network; and control means for controlling whether to output the output information generated by the first generation means or the image data generated by the second generation means, based on the traffic amount measured by the measurement means.

According to another embodiment of the present invention, there is provided an output device capable of effecting an output from an output unit based on input information entered through a network, comprising:

supply means for electric power supply to the output unit;

measurement means for measuring the traffic amount on the network; and control means for controlling the electric power supply by the supply means, based on the traffic amount measured by the measurement means.

According to another embodiment of the present invention, there is provided an information processing apparatus capable of generating output information for output to an external device through a network, comprising:

instruction means for instructing electric power supply to the external device;

measurement means for measuring the traffic amount on the network; and control means for controlling whether or not to instruct the electric power supply by the instruction means, based on the traffic amount measured by the measurement means.

BRIEF DESCRIPTION OF THE DRAWINGS

FIG. 10 is a flow chart showing the power supply control sequence to be executed in the output control system shown in FIG. 9.

DESCRIPTION OF THE PREFERRED EMBODIMENTS

Now the present invention will be clarified in detail by preferred embodiments, shown in the attached drawings.
First Embodiment At first there will be explained a first embodiment of the present invention, with reference to FIGS. 1 to 3.

Figure 1:
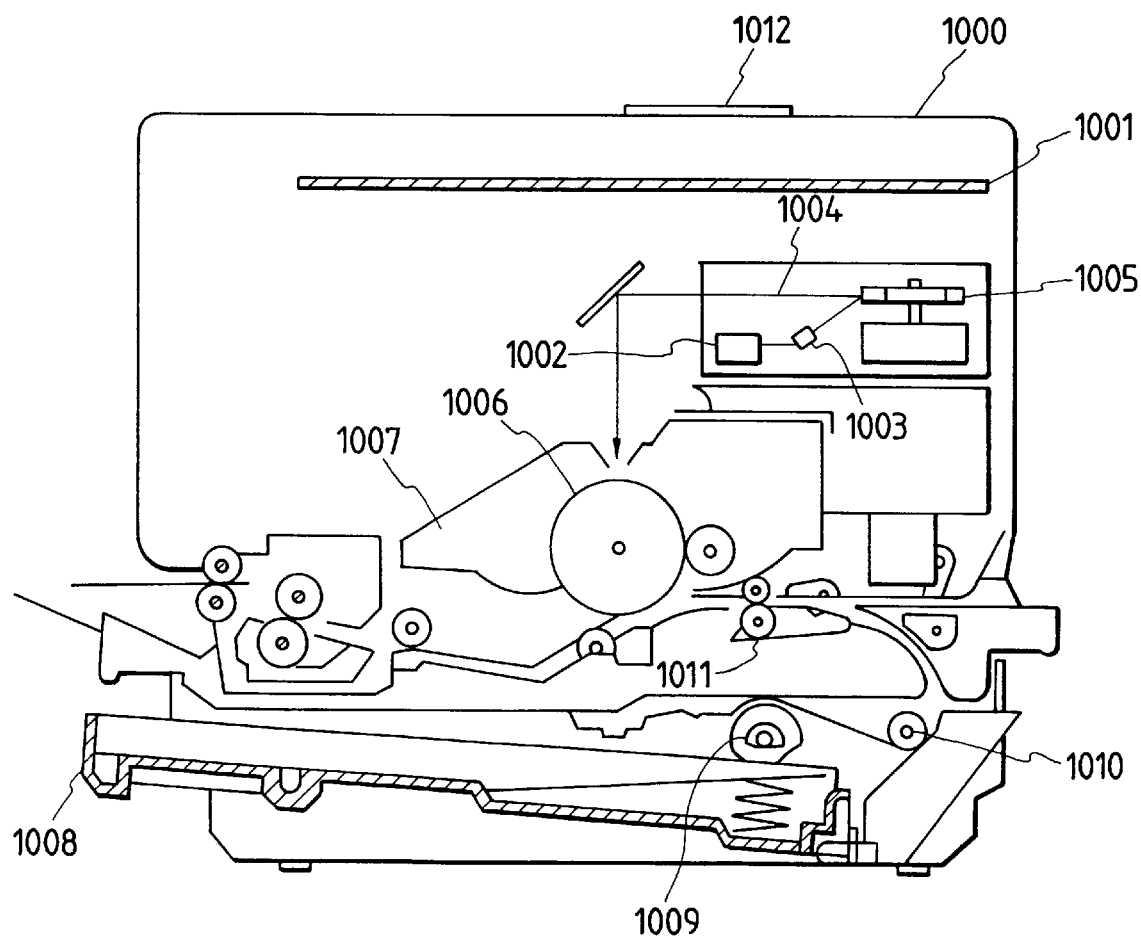
FIG. 1 is a schematic cross-sectional view of an output device (printer) constituting a first embodiment of the present invention.

FIG. 1 is a schematic cross-sectional view of an output device in which the present invention is applicable, wherein shown is a laser beam printer (hereinafter simply called printer) 1000 constituting the output device. The printer 1000 receives and stores print information such as character codes, form information and macro instructions supplied from an externally connected host computer, generates character patterns, form patterns etc. according to such received information and forms an image on a recording medium such as recording paper.

A printer control unit 1001 controls the entire printer 1000 and analyzes the character information etc. supplied from an operation panel provided with operation switches and LED display devices or from the host computer. The printer control unit 1001 supplies a laser driver 1002 principally with character information after conversion into a video signal of the corresponding character patterns.

A laser driver 1002 serves to drive a semiconductor laser 1003 and effects on-off control of a laser light 1004 emitted from the semiconductor laser 1003, according to the input video signal.

A laser light 1004 is deflected in the lateral direction by a rotary polygon mirror 1005 and scans an electrostatic drum 1006, thereby forming an electrostatic latent image of character patterns thereon. The electrostatic latent image is developed by a developing unit 1007 positioned around the electrostatic drum 1006, and the developed image is transferred onto a recording sheet.

The recording sheet is composed of a cut sheet, which is contained in a sheet cassette 1008 mounted on the printer 1000, is fed therein by a feed roller 1009 and transport rollers 1010, 1011 and supplied to the electrostatic drum 1006.

The printer 1000 is provided with at least an unrepresented card slot for connection of a card for optional fonts, to be used in addition to the installed fonts, or a control card of a different language system (an emulation card).

It is to be understood that the printer employed in the present embodiment is not limited to a laser beam printer or an ink jet printer, but can be the printer of any other type.

Figure 2:
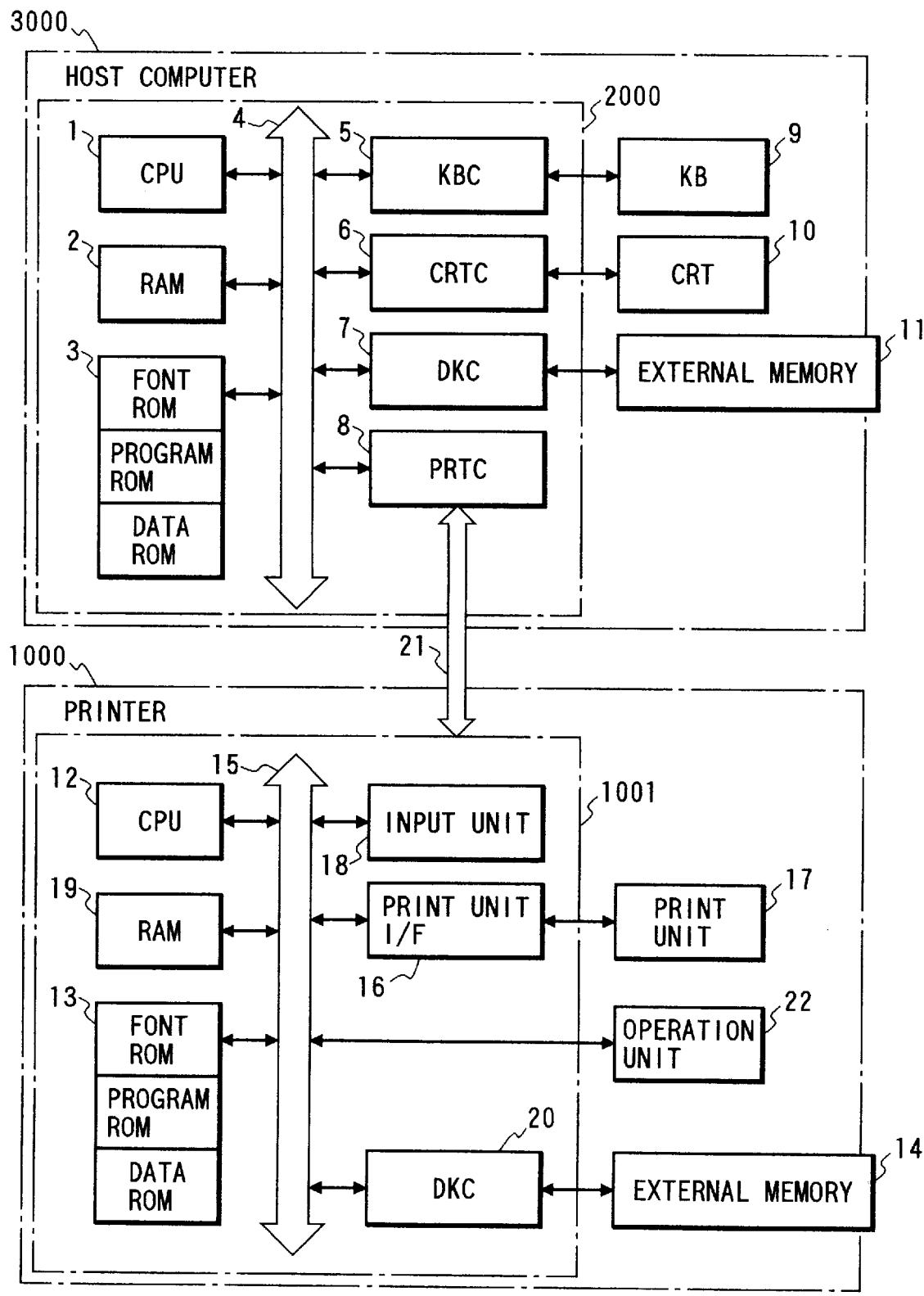
FIG. 2 is a block diagram of an output control system to which the printer shown in FIG. 1 is connected.

FIG. 2 is a block diagram showing the configuration of an output control system to which the printer 1000 shown in FIG. 1 is to be connected. The printer control system need not be composed of plural equipment as shown in FIG. 2 but may be composed of a simple equipment as long as the functions of the present invention are attained.

Referring to FIG. 2, a host computer 3000 is composed of a main computer unit 2000, a keyboard (KB) 9 connected thereto, a display unit (CRT) 10 for confirmation by the user, and an external memory 11 such as a hard disk (HD) or a floppy disk (FD) for storing boot programs, various applications, font data, user files editing files etc.

The main computer unit 2000 is provided with a CPU 1 for comprehensively controlling devices connected to a system bus 4, a RAM 2 functioning as a main memory and a work area of the CPU 1, a ROM 3 to be explained later, a keyboard controller (KBC) 5 for controlling the key inputs from the keyboard 9 and an unrepresented pointing device, a CRT controller (CRTC) 6 for controlling the display on the display unit 10, a disk controller (DKC) 20 for effecting access control of the external memory 11, and a printer controller (PRTC) 8 connected to the printer 1000 through a predetermined network interface (I/F) 21 and controlling the communication with the printer 1000.

The ROM 3 is composed of a program ROM for storing control programs for the CPU 1 as will be explained later, a font ROM for storing font data to be used in the text processing, and data ROM for storing various data (for example initial values for print information, error message etc.) to be used in the text processing.

The CPU 1 executes processing of a text, containing patterns, images, characters, tables (including table calculations) etc. according to a text processing program stored in the program ROM. The CPU 1 executes outline font development (rasterization) onto a display information RAM, for example defined on the RAM 2, thereby enabling WYSIWYG on the CRT 10. Also the CPU 1 opens various registered windows and executes various data processings according to the commands for example designated by an unrepresented mouse cursor on the CRT 10. Furthermore, the CPU 1 executes measurement of the traffic amount, setting of resolution, gradation etc. and data conversion.

The printer 1000 shown in FIG. 2 is principally composed of a printer control unit 1001 for controlling the entire printer 1000 and analyzing the character information etc. supplied from the operation panel provided with operation switches and LED display units or from the host computer, an external memory 14 such as a hard disk, a printer unit (printer engine) 17, and an operation unit 22 consisting of an operation panel provided with switches and LED display devices for controlling various operations of the printer control unit 1001.

The printer control unit 1001 is provided with a printer CPU 12 for comprehensively controlling the access to various devices connected to a system bus 15 and outputting an image signal constituting the output information to the print unit (printer engine) 17 connected through a printer interface 16, a ROM 13 to be explained later, a printer interface 16, an input unit 18, a RAM 19 to be used as an output information development area, an environment data storage area and an NVRAM, and a disk controller (DKC) 20 for access control for the external memory 14 such as a hard disk (HD) or an IC card.

The ROM 13 is composed of a program ROM for storing control programs for the CPU 12 as will be explained later, a font ROM for storing font data to be used in the generation of the output information, and a data ROM for storing information to be used on the host computer in case the printer is not provided with the external memory 14 such as a hard disk.

The printer CPU 12 comprehensively controls the access to the above-mentioned devices connected to the system bus 15, based on a control program stored in the program ROM or a control program stored in the external memory 14. The printer CPU 12 is also rendered capable of communication with the host computer 3000 through the input unit 18, thereby informing the host computer 3000 with the information on the printer.

The RAM 19 is so constructed as to be expandable in the memory capacity by an option RAM to be connected to an unrepresented expansion port.

The external memory 14 is connected as an option and serves to store font data, emulation data, form data etc. The number of the external memory 14 is not limited to one, but there may be connected two or more external memories such as an optional font card storing optional fonts to be in addition to the installed fonts, or a memory storing a program for interpreting the printer control languages of different language systems. Also the external memory 14 may be provided with an unrepresented NVRAM for storing printer mode setting information supplied from the operation unit 22 or the host computer.

Figure 3:
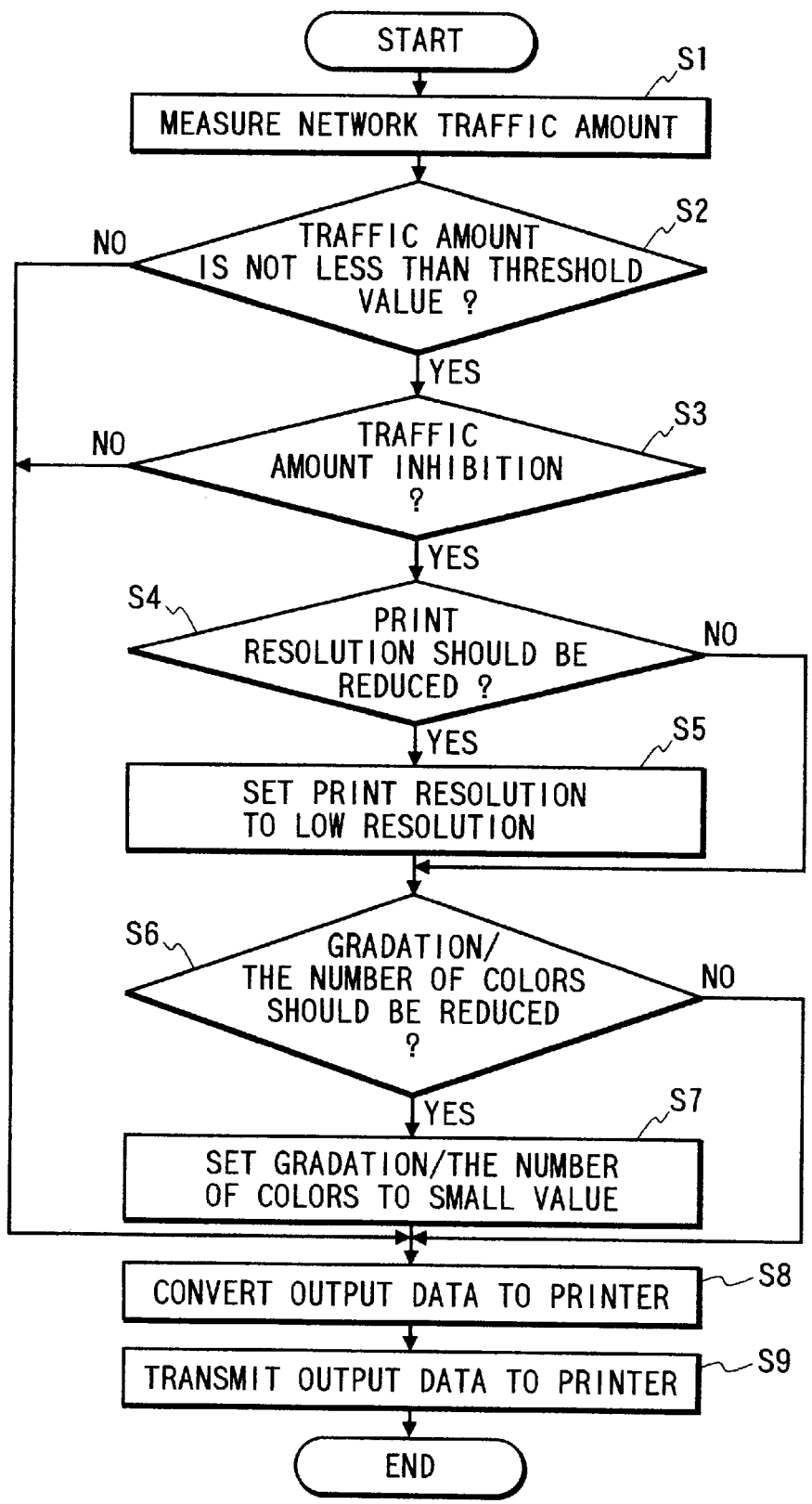
FIG. 3 is a flow chart showing the data transmission sequence for transmitting input data by conversion into output data matching the printer.

FIG. 3 is a flow chart showing a data transmission sequence, for converting and transmitting the input data in output data matching the printer 1000, according to the traffic amount on the network. A program for executing this sequence is stored in the external memory 11 and is executed by the CPU 1 of the host computer 3000.

Referring to FIG. 3, there is at first measured the data traffic amount on the network (step S1).

The data traffic amount can be measured in the following two methods.

A method consists of measuring the amount of packets flowing into the host computer.

The data flowing from the host computer 3000 to the printer 2000 are composed, for example in case of a page description language, of a job start command, then data consisting of print controlling commands and character data, and finally a job end command. For the purpose of transmission on the network, such serial data, being considerably large in the amount, are divided into a predetermined amount (in the unit for example of 512 or 1500 bytes, according to a manner predetermined in the protocol) and each divided unit is given a header for transmission. Each unit of such divided data is called a packet.

On the network there exist not only the page description language mentioned above but also data of various formats, but all such data are common in that they have a header in the beginning and then data of a predetermined number of bytes. The printer 1000 is to analyze and print only the data transmitted from the host computer 3000 to the printer 1000, but the data of various kinds not related to the process by the host computer 3000 or the printer 1000 also pass through the printer 1000.

Thus the traffic amount can be measured by measuring the amount of the passing packets, received by the host computer 3000 within a predetermined time.

Another method of measuring the traffic amount consists of measuring the frequency of collisions.

The amount of data that can flow on the network is defined for example as 10 Mbytes, but in practice the data traffic becomes jammed when 30 to 40% of the above-mentioned capacity is filled.

Packets cannot be transmitted at the same time from different devices connected to the same network. Therefore, if the packet transmissions occur simultaneously, such packets are once canceled and have to be transmitted again.

Such occurrence of simultaneous packet generations is called a collision. The frequency of such collision becomes very high, once the capacity band of the network is used up by 30 to 40%, and the utilization of the network becomes difficult under such situation. The traffic amount can also be defined by measuring, on the host computer 3000, the frequency of such collisions.

Then, there is discriminated whether the data traffic amount is not less than a predetermined threshold value (step S2). The discrimination is made by judging whether the packet amount reaches a predetermined judgment value, which can for example be 3 Mbytes, corresponding to 30% of 10 Mbytes, within a predetermined time, or whether the number of collisions reaches a predetermined value within a predetermined time. In case the discrimination of the step S2 turns out as YES, there is then discriminated whether the increase in the data traffic amount by the data output to the printer is to be suppressed, according to a predetermined process judgment value (step S3).

In case the result of the step S3 is affirmative (YES), namely in case the increase of the data traffic amount is to be suppressed, there is discriminated, according to the process judgment value used in the discrimination of the step S3, whether the print resolution is to be lowered in the current situation (step S4). In case the result of the step S4 is affirmative (YES), the preset print resolution is temporarily reduced to a lower resolution (step S5).

Then there is discriminated, according to the above-mentioned process judgment value, whether the number of gradation levels or colors is to be reduced in the current situation (step S6), and, if the result is affirmative (YES), the preset number of gradation levels or colors is temporarily reduced to a smaller number (step S7). Then the data generated by the application software are converted, according to thus set print resolution, number of gradation levels and number of colors, into data of the printer description language mating the printer 1000 (step S8), and thus converted data are transmitted to the printer 1000 (step S9). The data transmission is made in the packet format explained above. The present sequence is terminated when the transmission of the output data is completed.

On the other hand, in case the result of the step S2 or S3 is negative (NO), the sequence proceeds immediately to the step S8 since the data traffic amount need not be suppressed. Also in case the result of the step S4 is negative (NO), the sequence skips the step S5 and proceeds to the step S6 since the print resolution need not be lowered. Also in case the result of the step S6 is negative (NO), the sequence skips the step S7 and proceeds to the step S8 since the number of gradation levels or colors need not be reduced.

As explained in the foregoing, the present embodiment allows to minimize the data traffic amount relating to the output process on the network, since the amount of the output data from the host computer 3000 to the output device (printer 1000) is dynamically adjusted by the change in the print resolution, the number of gradation levels or colors according to the data traffic amount on the network.

Second Embodiment

In the following there will be explained a second embodiment of the present invention, with reference to a flow chart shown in FIG. 4. In this embodiment, the configuration of the output control system can be same as that of the foregoing first embodiment shown in FIG. 2.

Figure 4:
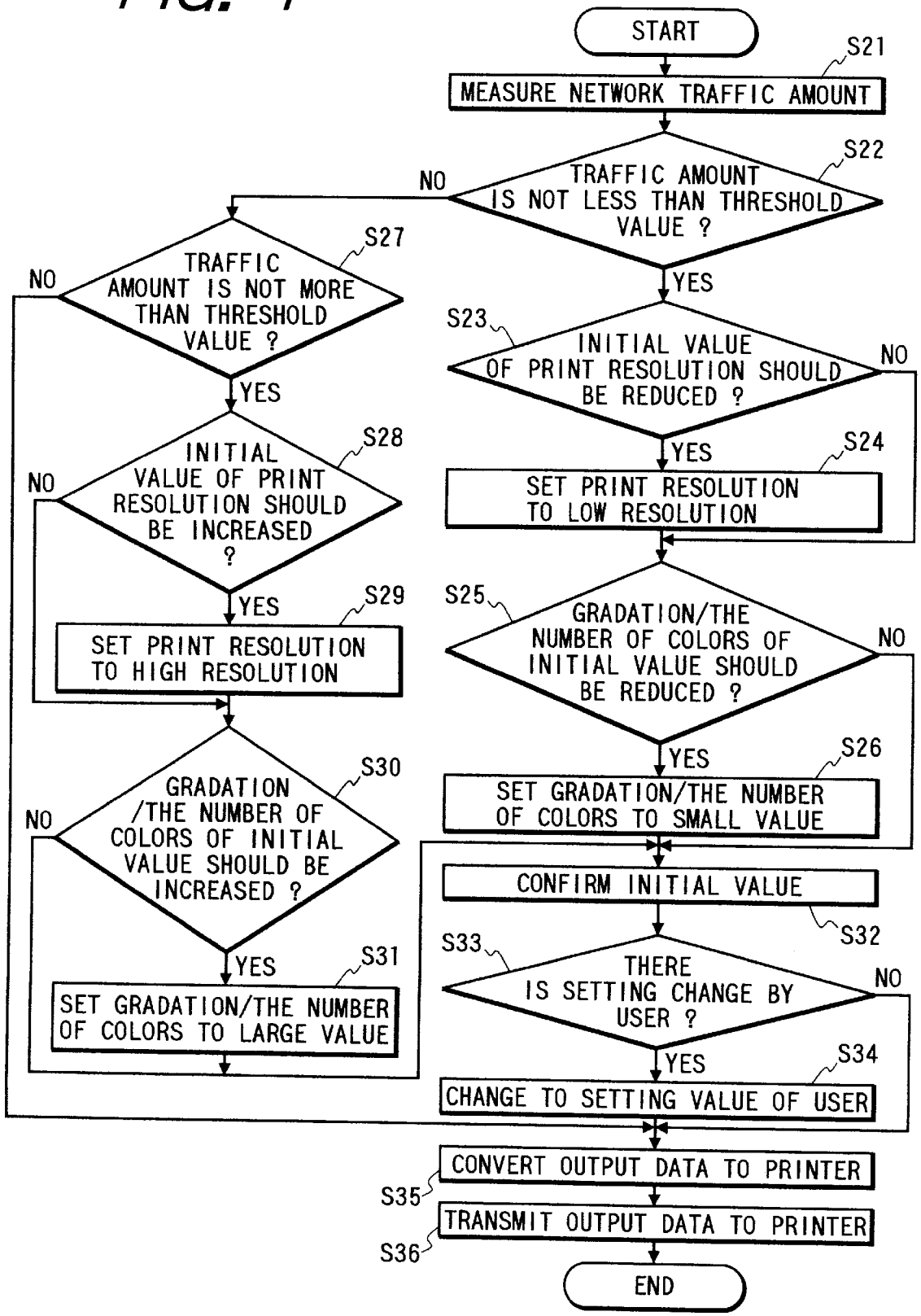
FIG. 4 is a flow chart showing the data transmission sequence to be executed in an output control system constituting a second embodiment of the present invention.

FIG. 4 is a flow chart showing the data transmission sequence for converting and transmitting the output data in a format matching the printer 1000. In the present embodiment, simultaneously with the conversion into the output data to the printer 1000, there is executed a change in the initial process values of the output data conversion. The corresponding control sequences are stored in the external memory 11.

At first there is measured the data traffic amount on the network (step S21), in the manner as explained in the embodiment 1. Then there is discriminated whether the data traffic amount is not less than a predetermined threshold value (step S22), and, if the result of the step S22 is affirmative (YES), there is discriminated whether the print resolution is to be lowered in the current situation according to a predetermined process judgment value (step S23). In case the result of the step S23 is affirmative (YES), the initial process value of the print resolution is changed from a preset resolution to a lower resolution (step S24).

Then there is discriminated, according to the above-mentioned process judgment value, whether the number of gradation levels or colors is to be reduced in the current situation (step S25), and, if the result is affirmative (YES), the initial process value for the number of gradation levels or colors is changed from a preset value to a smaller value (step S26). After the change in the step S26, there is executed a step S32 to be explained later.

In case the result of the step S23 is negative (NO), the sequence skips the step S24 and proceeds to the step S25, since the print resolution need not be lowered. Also in case the result of the step S25 is negative (NO), the sequence skips the step S26 and proceeds to the step S32 to be explained later, since the number of gradation levels or colors need not be reduced.

On the other hand, if the result of the step S22 is negative (NO), there is discriminated whether the data traffic amount is not more than a predetermined threshold value (step S27), and, if the result is affirmative (YES), there is discriminated, according to a predetermined process judgment value, whether the initial process value of the print resolution is to be increased in the current situation (step S28). If the result is affirmative (YES), the print resolution is changed to a higher resolution. Then there is discriminated, according to the above-mentioned process judgment value, whether the number of gradation levels or colors of the print data is to be increased in the current situation (step S30), and, if the result is affirmative (YES), the initial process value for the number of gradation levels or colors is changed to a larger value (step S31). In case the result of the step S28 is negative (NO), the sequence skips the step S29 and proceeds to the step S30, since the print resolution is not to be elevated. Also in case the result of the step S30 is negative (NO), the sequence skips the step S31 and proceeds to the step S32 to be explained later, since the number of gradation levels or colors is not to be increased.

After the setting of the initial values, there is executed a step of causing the user to confirm the set initial values (step S32). In this step, the set initial values are displayed on the CRT 10 of the host computer 3000, whereby the user can confirm the set initial values. If desirable, the user can arbitrarily change the initial values utilizing for example the keyboard 9. Then there is discriminated whether the set values have been changed by the user (step S33), and, if the result is affirmative (YES), the initial process values are changed to those changed by the user (step S34).

Then the input data are converted, according to thus set print resolution and numbers of gradation levels and colors, into the data in the printer description language matching the printer 1000 (step S35), and the converted data (output data) are transmitted to the printer 1000 (step S36). On the other hand, in case the result of the step S33 is negative (NO), the sequence skips the step S34 and proceeds immediately to the step S35. Also in case the result of the step S27 is negative (NO), the sequence proceeds directly to the step S35. The present sequence is terminated when the transmission of the output data is completed.

As explained in the foregoing, the present embodiment allows to minimize the data traffic amount relating to the output process on the network, since the amount of the output data from the host computer to the output device is dynamically adjusted by the setting of the initial process value for the print resolution, the number of gradation levels or colors according to the data traffic amount on the network.

In the present embodiment, it is possible also to add, in addition to the change of the initial values of the print resolution and the number of gradation levels or colors according to the data traffic amount on the network, an optional method of suppressing the amount of the transmitted output data by data compression. In case of selecting such method of compressing the transmitted output data, it is rendered possible to further effectively reduce the data traffic amount on the network, by executing such data compression according to the content of the data, for example limiting the compression to the print image data. In general, the data compression is possible both for the page description language and for the image data, but the compression for the page description language has always to be made by a reversible compression.

Also the process speed of the printer 1000 need not necessarily be a predetermined value but can be an actual process speed at the data transmission. For this purpose a step for acquiring information relating to the process speed of the printer 1000 may be added to the flow chart shown in FIG. 4.

Third Embodiment

In the following there will be explained a third embodiment of the present invention, with reference to a flow chart shown in FIG. 5. In this embodiment, the configuration of the output control system can be same as that of the foregoing first embodiment shown in FIG. 2 and the following description will therefore refer to FIG. 2.

Figure 5:
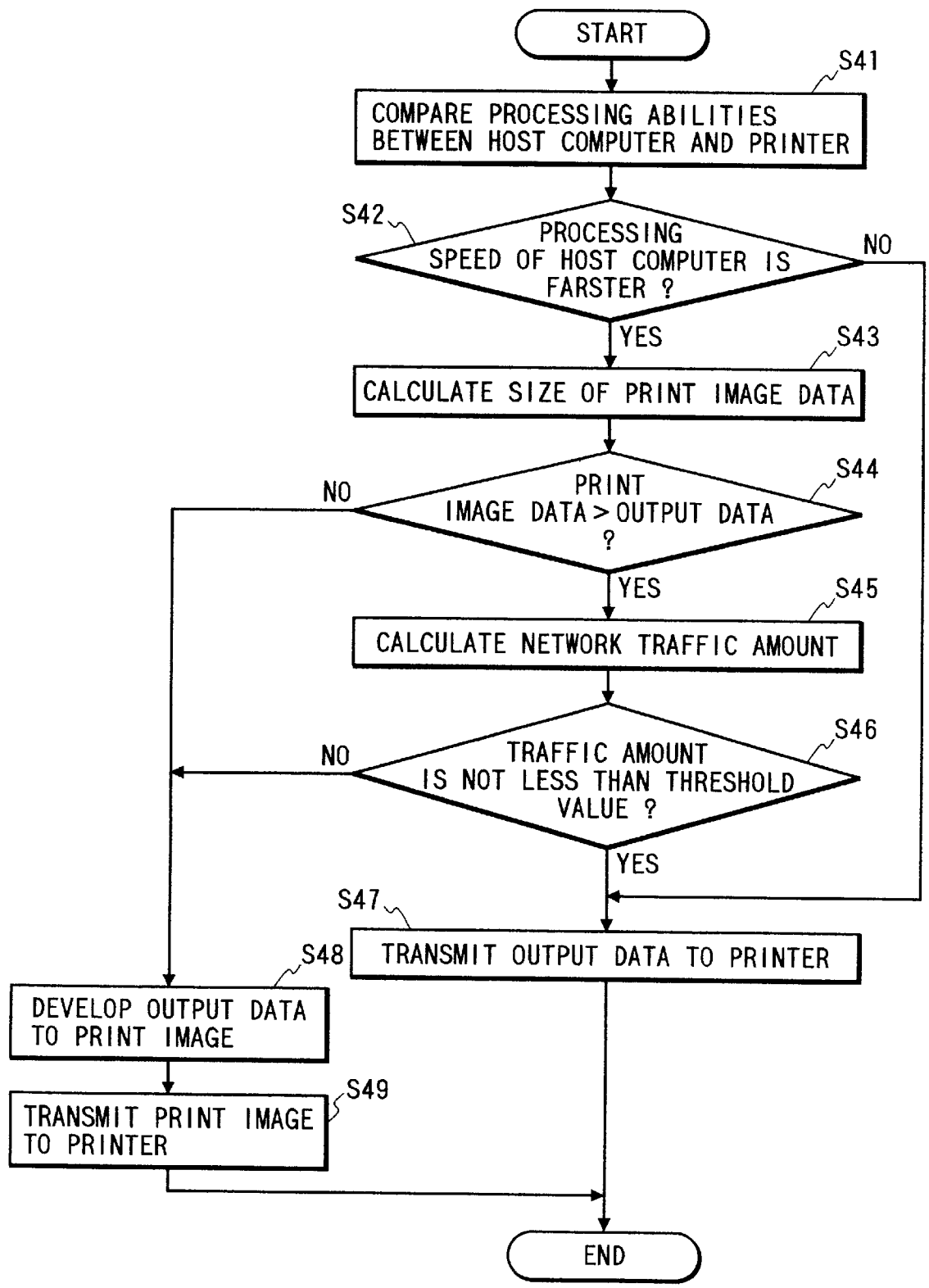
FIG. 5 is a flow chart showing the data transmission sequence to be executed in an output control system constituting a third embodiment of the present invention.

FIG. 5 is a flow chart showing the transmission sequence for the output data from the host computer 3000 to the printer 1000 in the output control system of the present embodiment. In the present embodiment, the content of the output data transmitted to the printer 1000 is changed according to the process ability of the host computer 3000 and the printer 1000 and to the data traffic amount on the network. The corresponding control sequences are stored in the external memory 11.

At first a measured value of the process speed of the host computer 3000 is compared with the process speed of the printer 1000 (step S41). The process speed of the printer 1000 is recorded in advance for example in the RAM 2 of the host computer 3000. The information on such process speed can be acquired by bidirectional communication with the printer 1000.

Based on the result of comparison in the step S41, there is discriminated whether the process speed of the host computer 3000 is higher (step S42), then, if the result is affirmative (YES), there is calculated an estimated value of the data size of the print image to be generated from the output data (step S43), and there is discriminated whether thus calculated estimated value is larger by a predetermined proportion than the size of the output data (step S44).

If the result is affirmative (YES), there is measured the data traffic amount on the network to which the host computer 3000 and the printer 1000 are connected (step S45), and there is discriminated whether the measured data traffic amount is not less than a predetermined threshold value (step S46). If the result of the step S46 is affirmative (YES), the print image data are not generated from the output data but the output data are directly transmitted to the printer 1000. The present sequence is terminated after the transmission of the output data is completed. Such transmission of the output data may be made in various formats, not only in the page description language but also as the GDI data which are generated according to the operating system and are prior to the conversion into the page description language based on the printer driver, or in the form of compressed data obtained by a reversible or irreversible compression.

On the other hand, in case the result of the above-mentioned step S44 or S46 is negative (NO), there is executed a process of generating the print image data from the output data (step S48), and thus generated print image data are transmitted to the printer 1000 (step S49). The present sequence is terminated after the transmission of the print image data is completed.

As explained in the foregoing, the present embodiment allows to reduce the output process time, against the lowering in the data transfer efficiency on the network, since the transmitted data are dynamically switched to the output data or the print image data, depending on the data traffic amount on the network or on the process capability of the host computer 3000 and the printer 1000 serving as the output device.

Fourth Embodiment

In the following a fourth embodiment of the present invention will be explained with reference to FIGS. 6 and 7.

Figure 6:
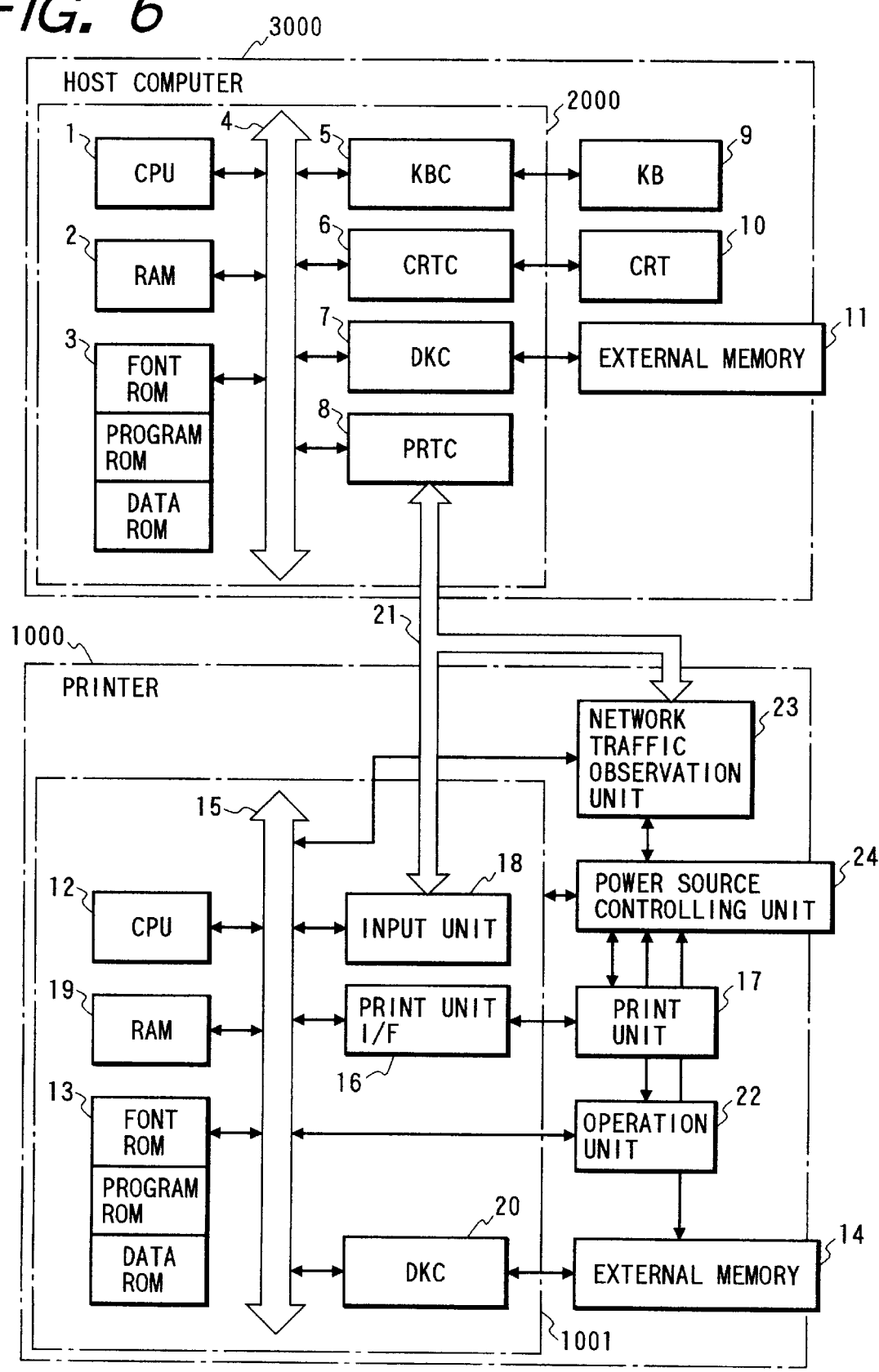
FIG. 6 is a block diagram showing the configuration of an output control system constituting a fourth embodiment of the present invention.

FIG. 6 is a block diagram of an output control system of the present embodiment, which is provided, in addition to the output control system of the first embodiment shown in FIG. 2, with a network traffic monitoring unit 23 serving as traffic measuring means for monitoring the data traffic amount on the network in which the printer 1000 is connected and sending the information on the data traffic amount to a power supply control unit 24 and the printer control unit 1001, and a power supply control unit 24 serving as control means for controlling the power supply to the various devices in the printer 1000. Other components are equivalent to those in FIG. 2 and are therefore represented by corresponding numbers. The CPU 12 controls the discrimination of the power supply state, and the printer controller 8 controls the transmission of a switching signal.

Figure 7:
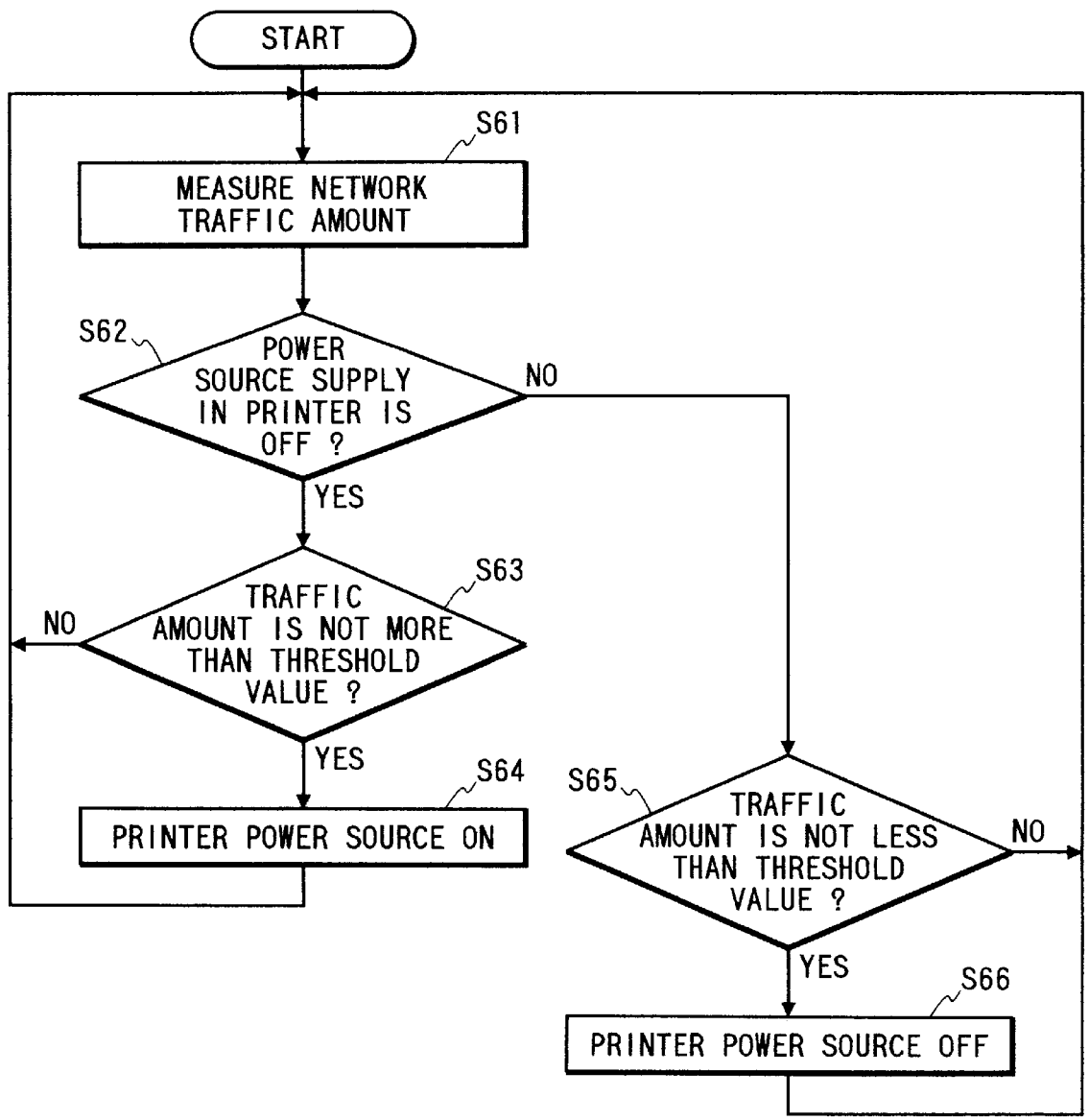
FIG. 7 is a flow chart showing the power supply control sequence to be executed in the fourth embodiment.

FIG. 7 is a flow chart showing a power supply controlling sequence in the output control system of the present embodiment. In the present embodiment, the power supply to the various devices in the printer is controlled according to the data traffic amount on the network. A program for executing the present flow chart is stored in the ROM 13 of the printer 1000 and is executed by the printer CPU 12.

At first the data traffic amount on the network is measured (step S61), and there is discriminated whether the power supply to the devices in the printer 1000, except for the network traffic monitoring unit 23, is in an OFF state (step S62). In the above-mentioned OFF state, the power supply is cut off not completely but only in the units of higher electric power consumption, such as the engine unit, and the network traffic monitoring unit 23 and the power supply control unit 24 are still powered.

In such state the electric power supply may be cut off for the entire engine unit or only for the fixing unit which has a particularly high electric power consumption.

The switching from such OFF state to the ON state can be achieved by starting the power supply to the various devices in the OFF state, from the power supply control unit 24 which is maintained in the active state.

In case the result of the step S62 is affirmative (YES), there is discriminated whether the data traffic amount measured in the step S61 is not more than a predetermined threshold value (step S63).

If the result of the step S63 is affirmative (YES), the power supply control unit 24 turns on the power supply to the various devices in the printer 1000 (step S64), and the sequence starting from the step S61 is repeated. If the result of the step S63 is negative (NO), the sequence immediately returns to the step S61.

On the other hand, if the result of the step S62 is negative (NO), there is discriminated whether the data traffic amount measured in the step S61 exceeds a predetermined threshold value (step S65), and, if the result is affirmative (YES), the power supply control unit 24 is so controlled as to cut off the power supply to the various devices in the printer 1000, except for the network traffic monitoring unit 23 (step S66). Thereafter the sequence starting from the step S61 is repeated. If the result of the step S65 is negative (NO), the sequence immediately returns to the step S61.

As explained in the foregoing, the present embodiment allows to reduce the electric power consumption of the printer 1000, by cutting off the power supply to the various devices in the printer 1000 according to the data traffic amount on the network.

Fifth Embodiment

In the following a fifth embodiment of the present invention will be explained with reference to FIG. 8.

In comparison with the foregoing fourth embodiment in which the power supply to the various devices of the printer 1000 is on/off controlled according to the data traffic amount on the network, measured by the printer 1000 itself, the present fifth embodiment differs in that the traffic amount measurement and the on/off power supply control are executed by the host computer 3000 which is connected to the printer 1000 through the network interface.

In this embodiment, the power supply control can be realized by the configuration of the output control system of the foregoing first embodiment shown in FIG. 2 and the following description will therefore refer to FIG. 2.

Figure 8:
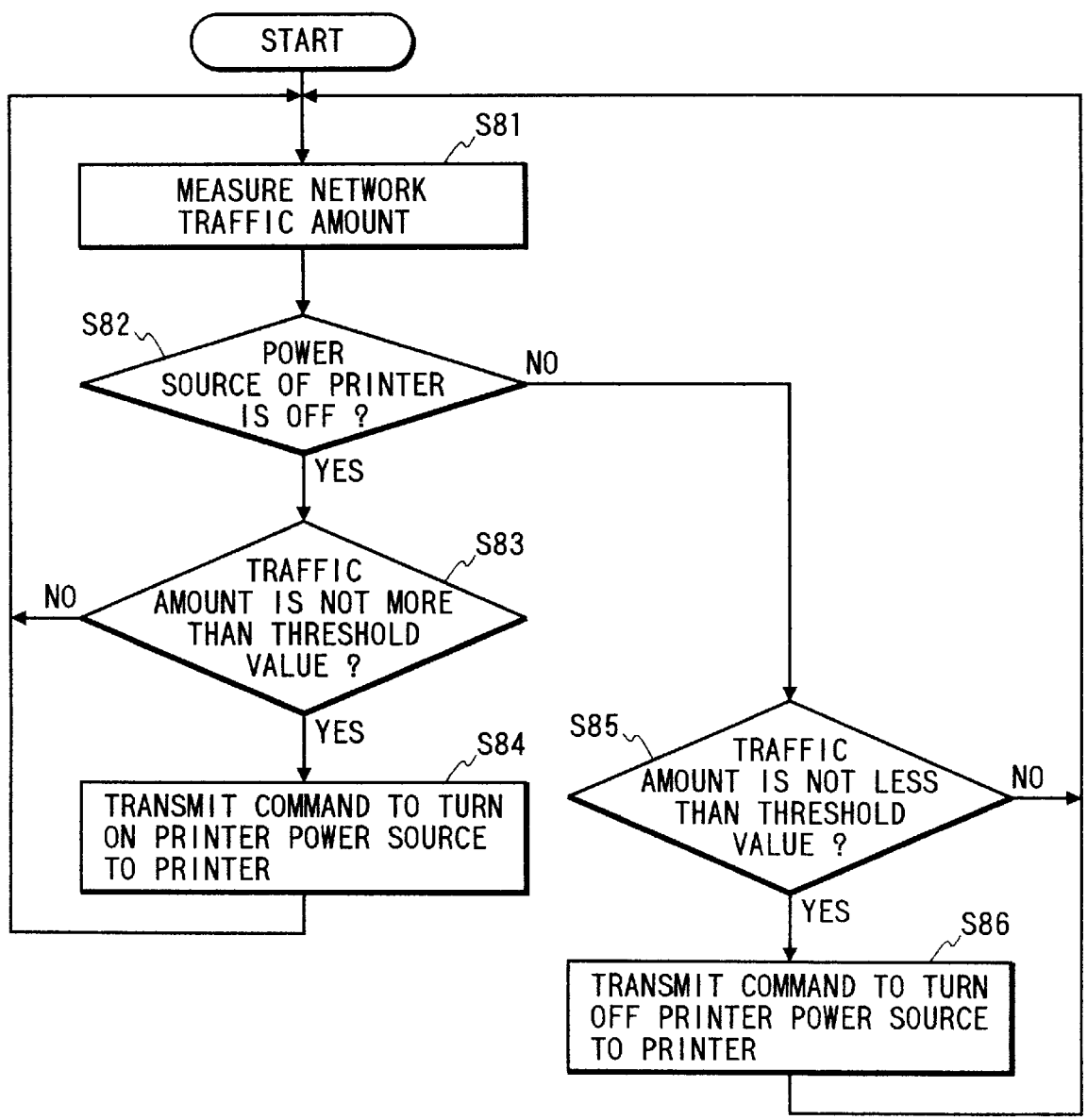
FIG. 8 is a flow chart showing the power supply control sequence to be executed in a fifth embodiment of the present invention.

FIG. 8 is a flow chart showing a power supply controlling sequence in the output control system of the present embodiment. A program for executing the present flow chart is stored in the ROM 3 of the host computer 3000 and is executed by the CPU 1.

At first the data traffic amount on the network is measured (step S81), and there is discriminated whether the power supply to the devices in the printer 1000 is in the ON state (step S82). In case the result of the step S82 is affirmative (YES), there is discriminated whether the data traffic amount measured in the step S81 is not more than a predetermined threshold value (step S83).

If the result of the step S83 is affirmative (YES), a command for turning on the power supply to the devices of the printer 1000 is transmitted from the host computer 3000 to the printer 1000 (step S84), and the process of the step S61 is thereafter repeated. If the result of the step S83 is negative (NO), the sequence immediately returns to the step S81.

On the other hand, if the result of the step S82 is negative (NO), there is discriminated whether the data traffic amount measured in the step S81 is not less than a predetermined threshold value (step S85), and, if the result is affirmative (YES), a command for turning off the power supply to the devices of the printer 1000 is transmitted from the host computer 3000 to the printer 1000 (step S86), and the sequence starting from the step S81 is thereafter repeated. If the result of the step S85 is negative (NO), the sequence immediately returns to the step S81.

As explained in the foregoing, the present embodiment allows to reduce the electric power consumption of the printer 1000, by controlling the power supply to the various devices in the printer 1000, in the host computer 3000. The present embodiment, in which the on/off state control for the output device is executed by the host computer 3000, can be applied to the output device of any type, since the output device itself is not required to have the function of on/off state control explained in the foregoing fourth embodiment.

Sixth Embodiment

In the following a sixth embodiment of the present invention will be explained with reference to FIGS. 9 and 10.

Figure 9:
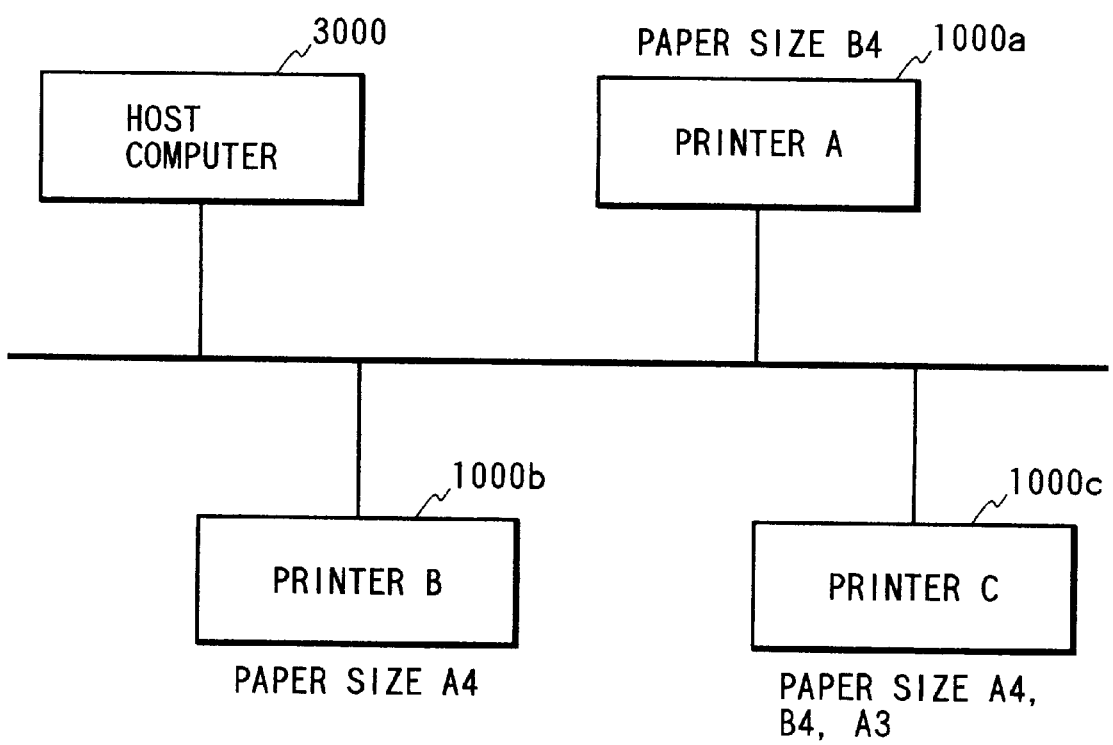
FIG. 9 is a schematic view showing the configuration of an output control system constituting a sixth embodiment of the present invention.

FIG. 9 is a schematic view showing the configuration of an output control system of the present embodiment.

In the foregoing fifth embodiment, the power supply to the printer is turned on or off solely according to whether the data traffic amount exceeds or is less than the predetermined threshold value. In the present embodiment, if plural printers are connected to the network, the information on the functions of such printers is collected in advance, and the power supply is on/off controlled in the printers other than those having the desired functions. As an example, in case plural printers with the recording sheets of mutually different sizes are connected to the network as shown in FIG. 9, the power supply is turned off in the printers except for a printer which contains the recording sheets of all the sizes when the data traffic amount is identified less than a predetermined threshold value.

FIG. 10 is a flow chart showing a power supply on/off control sequence to be executed in the output control system shown in FIG. 9. A program for executing this sequence is stored in the ROM 3 of the host computer 3000, and is executed by the CPU 1.

At first there are obtained, from the printers 1000a–1000c connected to the network to which the host computer 3000 is also connected, the functional information including, for example, the information on the size of the loaded recording sheets (step S101). Thus obtained functional information is stored in the RAM 2 or the external memory 11 of the host computer 11.

The sequence of ensuing steps S102 to S106 is same as that from the steps S81 to S85 in the foregoing fifth embodiment shown in FIG. 8.

If the step S106 identifies that the data traffic amount measured in the step S102 exceeds a predetermined threshold value, there is selected, among the printers 1000a–1000c, one in which the recording sheet of a desired size is loaded (step S107), and a command for shutting off the power supply to the devices is sent to the printers other than the selected one (step S108). After the transmission of the command, the sequence returns to the step S102.

As explained in the foregoing, the present embodiment gathers the functional information of the printers connected to the network in advance and effects the on/off control of the power supply to the printers other than that having the desired function, so that the electric power consumption of the printers can be saved even in an output control system containing plural printers connected to a network.

According to an embodiment of the present invention, as explained in the foregoing, the data traffic amount on the network is measured, then the data conversion method is set according to the measured data traffic amount, the data to be transmitted to the output device is converted according to the set conversion method, and then the converted data are transmitted to the output device. Consequently the amount of the data transmitted from the host computer to the output device is dynamically adjusted according to the data traffic amount, and there can be obtained an effect of minimizing the data traffic amount relating to the output process on the network.

Also according to another embodiment of the present invention, as explained in the foregoing, the processing ability of the output control device is compared with that of the output device, and the data conversion method is set according to the measured data traffic amount and to the result of such comparison. Consequently there can be obtained an effect of minimizing the extension of the output process time, resulting from the lowering in the data transmission efficiency on the network.

Also according to still another embodiment of the present invention, the data traffic amount on the network is measured, also the power supply state in the output device is judged, and the power supply state in the output device is controlled according to the measured data traffic amount and the result of such judgment, so that there can be obtained an effect of saving the electric power consumption in the output device.

Also according to still another embodiment of the present invention, there are provided traffic measurement means for measuring the data traffic amount on the network, power supply state judgment means for judging the power supply state in the output device, and control means for controlling the power supply state in the output device according to the measured data traffic amount and the result of judgment by the power supply state judgment means, thereby saving the electric power consumption of the output device.

What is claimed is:

1. An information processing apparatus for generating print information and sending the print information to a printing apparatus via a network, comprising:

measurement means for measuring a traffic amount on the network;

setting means for setting information to be used in generating the print information based on the traffic amount measured by said measurement means; and generation means for generating the print information based on the information set by said setting means, so as to enable the printing apparatus to perform a printing process based on the print information.

2. An apparatus according to claim 1, wherein said measurement means is adapted to measure the traffic amount by counting a number of packets recognizable on the network.

3. An apparatus according to claim 1, wherein said measurement means is adapted to measure the traffic amount by detecting a frequency of generation of collisions on the network.

4. An apparatus according to claim 1, wherein the information set by said setting means is information on a resolution.

5. An apparatus according to claim 1, wherein the information set by said setting means is information on a gradation.

6. An apparatus according to claim 1, wherein the print information generated by said generation means is provided in a page description language.

7. An apparatus according to claim 1, wherein said generation means generates the print information by converting information generated on an application into the print information based on the information set by said setting means.

8. An apparatus according to claim 1, further comprising display means for displaying the traffic amount measured by said measurement means.

9. An apparatus according to claim 4, wherein said setting means sets the information to indicate a decreased resolution if the traffic amount exceeds a predetermined value, and sets the information to indicate an increased resolution if the traffic amount does not exceed the predetermined value.

10. An apparatus according to claim 1, further comprising resetting means for resetting the information set by said setting means based on a command input.

11. An apparatus according to claim 1, further comprising compression means for compressing the print information generated by said generation means.

12. An information processing apparatus for generating print information and sending the print information to a printing apparatus via a network, comprising:

first generation means for generating print information;

second generation means for generating image data based on the print information generated by said first generation means;

measurement means for measuring a traffic amount on the network; and control means for controlling said second generation means to perform or not to perform the generation of the image data based on the traffic amount measured by said measurement means.

13. An apparatus according to claim 12, wherein said measurement means is adapted to measure the traffic amount by counting a number of packets recognizable on the network.

14. An apparatus according to claim 12, wherein said measurement means is adapted to measure the traffic amount by detecting a frequency of generation of collisions on the network.

15. An apparatus according to claim 12, wherein the print information generated by said first generation means is provided in a page description language.

16. An apparatus according to claim 12, wherein said first generation means generates the print information by converting information generated on an application into the print information.

17. An apparatus according to claim 12, further comprising display means for displaying the traffic amount measured by said measurement means.

18. An apparatus according to claim 12, further comprising comparison means for comparing a processing ability of said apparatus with that of the printing apparatus for processing the print information or the image data, wherein said control means controls said second generation means to perform or not to perform the generation of the image data based on a comparison result from said comparison means.

19. An apparatus according to claim 18, wherein said control means controls said second generation means not to perform the generation of the image data, regardless of the traffic amount measured by said measurement means, if said comparison means identifies that the processing ability of the printing apparatus is higher than that of said apparatus.

20. An information processing method for generating print information and sending the print information to a printing apparatus via a network, comprising the steps of:

measuring a traffic amount on the network;

setting information to be used in generating the print information based on the traffic amount measured in said measuring step; and generating the print information based on the information set in said setting step, so as to enable the printing apparatus to perform a printing process based on the print information.

21. A method according to claim 20, wherein said measuring step is adapted to measure the traffic amount by counting a number of packets recognizable on the network.

22. A method according to claim 20, wherein said measuring step is adapted to measure the traffic amount by detecting a frequency of generation of collisions on the network.

23. A method according to claim 20, wherein the information set in said setting step is information on a resolution.

24. A method according to claim 20, wherein the information set in said setting step is information on a gradation.

25. A method according to claim 20, wherein the print information generated in said generating step is provided in a page description language.

26. A method according to claim 20, wherein said generating step generates the print information by converting information generated on an application into the print information based on the information set in said setting step.

27. A method according to claim 20, further comprising the step of displaying the traffic amount measured in said measuring step.

28. A method according to claim 23, wherein said setting step sets the information to indicate a decreased resolution if the traffic amount exceeds a predetermined value, and sets the information to indicate an increased resolution if the traffic amount does not exceed the predetermined value.

29. A method according to claim 20, further comprising the step of resetting the information set in said setting step based on a command input.

30. A method according to claim 20, further comprising the step of compressing the print information generated in said generating step.

31. An information processing method for an information process apparatus, for generating print information and sending the print information to a printing apparatus via a network, comprising:

a first generation step of generating print information;

a second generation step of generating image data based on the print information generated in said first generation step;

a measurement step of measuring a traffic amount on the network; and a control step of controlling said second generation step to perform or not to perform the generation of the image data based on the traffic amount measured in said measurement step.

32. A method according to claim 31, wherein said measurement step is adapted to measure the traffic amount by counting a number of packets recognizable on the network.

33. A method according to claim 31, wherein said measurement step is adapted to measure the traffic amount by detecting a frequency of generation of collisions on the network.

34. A method according to claim 31, wherein the print information generated in said first generation step is provided in a page description language.

35. A method according to claim 31, wherein said first generation step generates the print information by converting information generated on an application into the print information.

36. A method according to claim 31, further comprising a display step of displaying the traffic amount measured in said measurement step.

37. A method according to claim 31, further comprising a comparison step of comparing a processing ability of the information processing apparatus with that of the printing apparatus for processing the print information or the image data,
   wherein said control step controls said second generation step to perform or not to perform the generation of the image data based on a comparison result from said comparison step.

38. A method according to claim 37, wherein said control step controls said second generation step not to perform the generation of the image data, regardless of the traffic amount measured in said measurement step, if said comparison step identifies that the processing ability of the printing apparatus is higher than that of the information processing apparatus.

39. A computer-readable storage medium storing a program for implementing an information processing method, wherein the method generates print information and sends the print information to a printing apparatus via a network, the program comprising:
   code for measuring a traffic amount on the network;
   code for setting information to be used in generating the print information based on the traffic amount measured using said code for measuring; and
   code for generating the print information based on the information set using said code for setting, so as to enable the printing apparatus to perform a printing process based on the print information.

40. A medium according to claim 39, wherein said code for measuring is adapted to measure the traffic amount by counting a number of packets recognizable on the network.

41. A medium according to claim 39, wherein said code for measuring is adapted to measure the traffic amount by detecting a frequency of generation of collisions on the network.

42. A medium according to claim 39, wherein the information set using said code for setting is information on a resolution.

43. A medium according to claim 39, wherein the information set using said code for setting is information on a gradation.

44. A medium according to claim 39, wherein the print information generated using said code for generating is provided in a page description language.

45. A medium according to claim 39, wherein said code for generating generates the print information by converting information generated on an application into the print information based on the information set using said code for setting.

46. A medium according to claim 39, wherein the program further comprises code for displaying the traffic amount measured using said code for measuring.

47. A medium according to claim 42, wherein said code for setting sets the information to indicate a decreased resolution if the traffic amount exceeds a predetermined value, and sets the information to indicate an increased resolution if the traffic amount does not exceed the predetermined value.

48. A medium according to claim 39, wherein the program further comprises code for resetting the information set using said code for setting based on a command input.

49. A medium according to claim 39, wherein the program further comprises code for compressing the print information generated using said code for generating.

50. A computer-readable storage medium storing a program for implementing an information processing method for an information process apparatus, wherein the method generates print information and sends the print information to a printing apparatus via a network, the program comprising:
   code for a first generation step of generating print information;
   code for a second generation step of generating image data based on the print information generated using said code for the first generation step;
   code for a measurement step of measuring a traffic amount on the network; and
   code for a control step of controlling said code for the second generation step to perform or not to perform the generation of the image data based on the traffic amount measured using said code for the measurement step.

51. A medium according to claim 50, wherein said code for the measurement step is adapted to measure the traffic amount by counting a number of packets recognizable on the network.

52. A medium according to claim 50, wherein said code for the measurement step is adapted to measure the traffic amount by detecting a frequency of generation of collisions on the network.

53. A medium according to claim 50, wherein the print information generated using said code for the first generation step is provided in a page description language.

54. A medium according to claim 50, wherein said code for the first generation step generates the print information by converting information generated on an application into the print information.

55. A medium according to claim 50, wherein the program further comprises code for a display step of displaying the traffic amount measured using said code for the measurement step.

56. A medium according to claim 50,
   wherein the program further comprises code for a comparison step of comparing a processing ability of the information processing apparatus with that of the printing apparatus for processing the print information or the image data, and
   wherein said code for the control step controls said code for the second generation step to perform or not to perform the generation of the image data based on a comparison result from said code for the comparison step.

57. A medium according to claim 56, wherein said code for the control step controls said code for the second generation step not to perform the generation of the image data, regardless of the traffic amount measured using said code for the measurement step, if said code for the comparison step identifies that the processing ability of the printing apparatus is higher than that of the information processing apparatus.

* * * * *

UNITED STATES PATENT AND TRADEMARK OFFICE
CERTIFICATE OF CORRECTION

PATENT NO. : 6,111,657
DATED : August 29, 2000
INVENTOR(S) : SHIN MUTO ET AL.

It is certified that error appears in the above-identified patent and that said Letters Patent is hereby corrected as shown below:

[30] FOREIGN APPLICATION PRIORITY DATA

"Apr. 9, 1998" should read --Sept. 25, 1996--.

[57] ABSTRACT

Line 7, "number" should read --number of--.

Signed and Sealed this

Fifteenth Day of May, 2001

Attest:

NICHOLAS P. GODICI

*Attesting Officer*    *Acting Director of the United States Patent and Trademark Office*